United States Patent [19] [11] 3,765,268

McMillan [45] Oct. 16, 1973

[54] BELT MECHANISM

[75] Inventor: Stephen L. McMillan, Louisville, Ky.

[73] Assignee: General Electric Company, Louisville, Ky.

[22] Filed: July 3, 1972

[21] Appl. No.: 268,846

[52] U.S. Cl. .................................... 74/640, 74/804
[51] Int. Cl. ........................ F16h 1/28, F16h 35/00
[58] Field of Search ........................................ 74/640

[56] References Cited

UNITED STATES PATENTS

| | | | |
|---|---|---|---|
| 1,775,029 | 9/1930 | Hippenmeger | 74/640 |
| 3,015,972 | 1/1962 | Voigt | 74/640 X |
| 3,148,560 | 9/1964 | Woodward, Jr. | 74/640 X |
| 3,307,434 | 3/1967 | Kope | 74/804 |
| 3,710,635 | 1/1973 | Whitehorn | 74/805 X |

*Primary Examiner*—Arthur I. McKeon
*Attorney*—Jon Carl Gealow et al.

[57] ABSTRACT

A motion reduction mechanism for use with a belt drive system. A drive belt is placed between a stationary member having an internal semicylindrical drive surface concentric with a drive shaft, and a rotating member secured to the drive shaft. The rotating member includes two or more rollers, the axes of which are parallel to and revolve about the shaft as the shaft rotates. As the axis of a roller is rotated within the arc defined by the drive surface, it holds a portion of the belt in engagement with the semicylindrical drive surface. Rotation of the rotating member causes the portion of the belt held in engagement with the semicylindrical drive surface to advance around the rotating member in a direction opposite to the direction of rotation of the drive member. Just as one of the rollers advances to release the belt from one end of the drive surface, the following adjacent roller engages the belt with the other end of the drive surface. The belt is advanced by the difference between a first belt pitch line length about the rotating member defined when the rotating member is in the position where one roller is engaging, and the adjacent roller disengaging the belt from the drive surface, and a second belt pitch line length measured about the drive surface between the points of engagement and disengagement of the belt.

7 Claims, 9 Drawing Figures

12 14 32 34 22 20 16 30 18 28 44 48 24 50 26 42 40 36 46 38 10

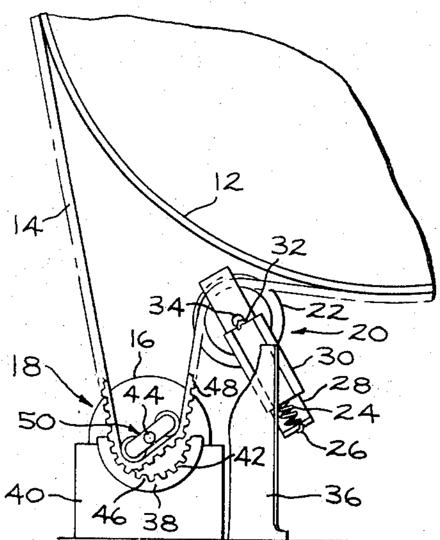
FIG.1
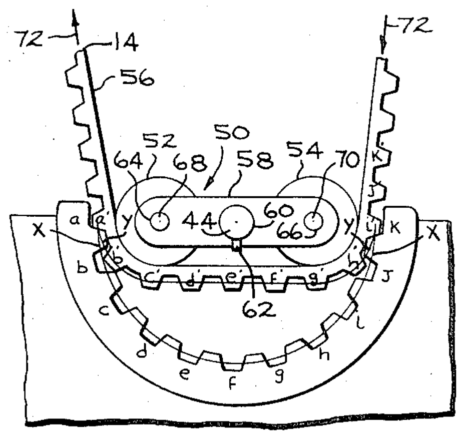
FIG. 2a
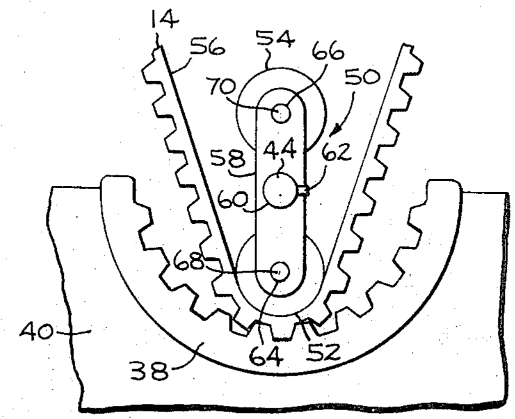
FIG.2c
FIG.2b
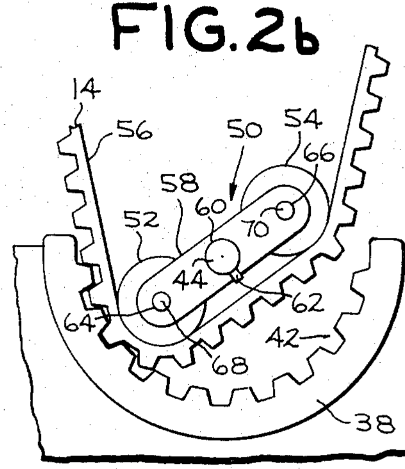
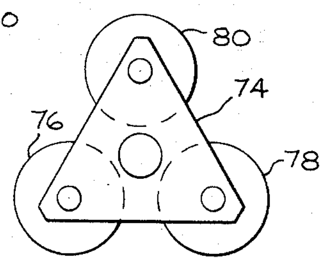
FIG.4
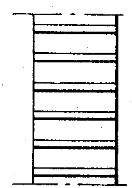
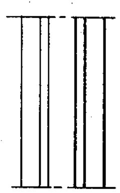
FIG.3a FIG.3b FIG.3c
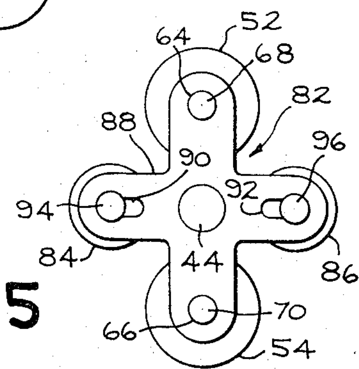
FIG.5

BELT MECHANISM

BACKGROUND OF THE INVENTION

The present invention relates to a belt drive means, and more particularly to a speed reduction means for driving a belt which in turn drives a pulley-type member.

Motion reduction and force amplification between a motor shaft and a driven shaft in a belt drive mechanism is typically provided by placing a relatively smaller diameter pulley on the motor shaft and a relatively larger diameter pulley on the driven shaft. In numerous applications there are practical limitations on the ratios of diameters of the two pulleys, i.e., the maximum permissible size of the larger diameter pulley and the minimum diameter of the smaller diameter pulley determined by minimum necessary contact arc with the belt and/or minimum bending radius of the belt. Additional motion reduction may be obtained by providing a two stage reduction. However, in a two stage reduction, a second belt, an additional shaft with two pulleys thereon, and bearings for supporting the additional shaft are required.

The principal object of the present invention is to provide a higher motion reduction and force amplification belt drive arrangement than is practical with conventional pulleys and belts.

A further object of the present invention is to provide a compact belt drive arrangement having high motion reduction and forced amplification with a minimum number of components.

SUMMARY OF THE INVENTION

The foregoing objects are accomplished in accordance with this invention, in one form thereof, by providing a stationary or fixed member having a drive surface in the form of a portion of an internal cylindrical surface having a radius $R_1$ which is concentric with the axis of a shaft driven by a prime mover. A rotating member secured to the shaft for rotation therewith includes at least a pair of rollers supported for rotation on axes parallel to and spaced from the shaft axis. The axis of each of the rollers revolves about the axis of the shaft in cylindrical path with a radius $R_2$. The surface of each of the cylindrical rollers closest to the internal cylindrical surface is spaced from the internal cylindrical surface by a fixed distance D equal to the difference between the radius $R_1$ of the internal cylindrical surface and the sum of the radius $R_2$ and the roller radius $R_3$ for each roller.

A drive belt is positioned between the drive surface of the stationary member and the rotating member such that as the shaft and roller axes revolve, the drive surface of the belt is engaged by the drive surface of the stationary member, and the opposite surface of the belt is engaged by the surface of at least one of the rollers, so as to force the belt into engagement with the drive surface and prevent slippage therebetween. The angular spacing between adjacent roller axes, with respect to the shaft axis, is approximately equal to the angular length of the drive surface. Thus, as the shaft rotates one and only one of said rollers forces the belt into engagement with the drive surface, except when one of said rollers is bringing the belt into engagement with the drive surface, and the adjacent roller is releasing the belt from engagement with the drive surface.

A first pitch line distance of the belt is defined by the drive surface between the point at which one of the rollers first causes engagement of the belt with the drive surface, and the point at which the same roller last causes engagement of the belt with the drive surface. A second pitch line distance of the belt is defined as the length of the belt extending between the point at which a first roller first causes engagement of the belt with the drive surface and the point at which an adjacent roller last causes engagement of the belt with the drive surface. The belt is caused to advance by a distance corresponding to the difference between the first and second pitch line distances as the shaft is rotated to advance the first roller to the original position of the other roller.

BRIEF DESCRIPTION OF THE DRAWINGS

FIG. 1 is a side elevational view of a first embodiment of the belt drive mechanism of this invention;

FIGS. 2*a*, *b* and *c* are enlarged side elevational views of a portion of the belt drive mechanism shown in FIG. 1, showing the drive mechanism in three different operative positions;

FIGS. 3*a*, *b* and *c* show at the top, portions of the drive surface of the stationary member designed for coaction with belts having the cross sections shown immediately below;

FIG. 4 is a side elevational view of a first modification of the rotating member utilized in a first alternative embodiment of this invention;

FIG. 5 is a side elevational view of a second modification of the rotating member utilized in a second alternative embodiment of this invention.

DESCRIPTION OF THE PREFERRED EMBODIMENTS

Referring now to the drawings, there is shown in FIG. 1 a side elevational view of a segment of a machine structure in which this invention may be used. The machine structure is shown having a base 10 and a generally cylindrical member 12 intended to be rotated by a belt 14. The belt 14 is driven by a motor 16 supported in suitable manner from the base 10.

Before describing the speed reduction means of this invention, identified generally by the numeral 18, it will be noted that appropriate tensioning of the belt 14 is provided by a tensioning mechanism 20. The tensioning mechanism 20 comprises an idler member or pulley 22 which engages the belt 14 as shown, so as to provide the desired amount of tension. Idler member 22 is biased into engagement with the belt by means of a spring 24 which has one end 26 secured to a slidable member 28 slidably mounted in a carrier 30 to which the other end 32 of the spring is connected. Idler member 22 is supported for rotation on a pin 34 secured on member 28. The carrier member 30 is supported from the base 10 by a support member 36. Thus, in tensioning mechanism 20, slidable member 28 is movable by spring 24 so as to bias the idler pulley 22 into engagement with the belt 14 with a force determined by the characteristics of the spring 24.

Referring now to both FIG. 1 and FIGS. 2*a*, *b* and *c*, the speed reduction mechanism of this invention will be described. The speed reduction mechanism 18 comprises a first fixed or stationary member 38 suitably supported by a support structure 40 from the base 10 of the machine structure. The fixed member 38 is provided with a semicylindrical drive surface 42 which is concentric with axis of shaft 44 of the motor 16. As shown in FIG. 1 and FIGS. 2*a*, *b* and *c*, the arcuate drive surface 42 of the fixed member 38 is provided with teeth 46 which mesh with corresponding teeth 48 provided on the outside surface of the belt 14.

Secured to motor shaft 44 for rotation therewith is a rotating member 50 which forms a second component of the speed reduction mechanism 18. The rotating member 50 includes two elements, shown as cylindrical rollers 52 and 54, which are positioned to engage the inner surface 56 of the belt 14 to hold the belt in engagement with the drive surface 42 of the fixed member 38 to substantially prevent slippage therebetween. The rotating member 50 further comprises a pair of spaced support arms, one of which 58 is shown. The support arm 58, and the identical one not shown, is provided with an aperture 60 at the center for receiving the motor shaft 44 and is secured to the motor shaft by a fastening means such as set screw 62. Apertures 64 and 66 are formed at opposite ends of the support arm 58 with their centers equally spaced from the center of aperture 60. Pinions 68 and 70 are received in apertures 64 and 66 to rotatably support the cylindrical rollers 52 and 54 respectively. While the elements engaging the inner surface of the belt are shown as cylindrical rollers 52 and 54, it is readily apparent that in accordance with this invention the elements may be stationary with respect to the rotating member 50, each having a smooth surface which makes sliding contact with the belt inner surface.

The manner of operation of the speed reducing means will best be understood by making reference to FIGS. 2*a*, *b* and *c*. Referring now to FIG. 2*a*, it will be assumed that the motor shaft 44 and, therefore, the rotating member 50 are rotated in the counterclockwise direction by the motor 16. In a manner to be described, this counterclockwise rotation of the motor shaft 44 will cause clockwise rotation of the belt about shaft 44 as indicated by the arrows 72. To aid in the description of the operation of the belt drive mechanism of this invention, a consecutive series of teeth on the drive belt 14 are labeled *a'*, *b'*, *c'*. . . *j'*, *k'*. Similarly, the space between the teeth 46 on the drive surface 42 of the fixed member 38 are consecutively labeled *a*, *b*, *c* . . . *j*, *k*. As shown at the left in FIG. 2*a*, as the rotating member 50 is rotated in the counterclockwise direction by the motor shaft 44, tooth *a'* on the belt meshes with the intertooth space a on the drive surface 42. As the rotating member 50 continues to rotate in the counterclockwise direction, in a consecutive manner, tooth *b'* of the belt will enter into intertooth space *b* on the drive surface 42, tooth *c'* of the belt will enter into space *c* on the drive surface 42, etc. As the rotating member 50 continues to rotate in the counterclockwise direction, it will successively move from the position shown in FIG. 2*a* to that shown in FIG. 2*b* to that shown in FIG. 2*c*. After the shaft 44 has rotated 180°, the cylindrical rollers 52 and 54 will have exchanged positions from that shown in FIG. 2*a*. It will be noted that when the rollers 52 and 54 have changed positions, rather than the belt tooth *i'* being in the last space *k* on the drive surface 42, the last space *k* will be occupied by belt tooth *k'*. In other words, as the shaft 44 rotated one-half turn, or 180°, the belt has advanced in the direction of the arrow 72 a distance equivalent to the spacing of two teeth.

It will be observed that the distance by which the belt is advanced in the direction of arrow 72 is the difference between the pitch line distance X—X about the drive surface 42 of the fixed member 38, and the pitch line distance Y—Y of the toothed outer drive surface of the belt 14 between the tooth *a'* and the tooth *i'* about the rotating member 50. The drive surface 42 has a pitch line distance X—X which is ten times the tooth spacing, while the belt has a pitch line distance Y—Y of eight times the tooth spacing. The difference of two tooth spaces is, as said before, the distance by which the belt is advanced in the direction of the arrow 72 for each one-half turn of the shaft 44.

In order to vary the amount of motion reduction provided by the belt drive mechanism of this invention, it is necessary to vary the difference between the length of the pitch line distance X—X on the drive surface 42 on the fixed member 38 as defined above, and the length of the pitch line distance Y—Y of the drive belt as defined above. It will be observed, that if teeth are provided on the drive belt 14 and drive surface 42 of the fixed member 38 as shown in FIGS. 2*a*, *b* and *c*, that the difference between the drive surface pitch line length and the belt pitch line length must be an integral multiple of the tooth spacing. Thus, if these pitch line lengths are made more equal, i.e., the difference made smaller, the drive speed reduction is increased.

The rotating member 50 need not be limited to two cylindrical rollers as shown in FIGS. 1 and 2*a*, *b* and *c*, but may be provided with a greater number of rollers, such as the three roller embodiment as shown in FIG. 4. When the rotating member 50 is provided with three rollers 76, 78 and 80, as shown in FIG. 4, the pitch line length of the belt extending between adjacent pairs of rollers will be closer to the pitch line length of the drive surface 42 of the fixed member 38. It should be noted that when a three-roller rotating member 50 is used as shown in FIG. 4, the relationship between the rollers and the drive surface of the fixed member is such that generally only one roller is holding the belt in engagement with the drive surface of the fixed member, except for that transitional period when one roller is releasing the belt and the next roller is engaging the belt. Such being the case, wherein rotation of the rotating member 50, will move the rollers into the positions formerly occupied by the adjacent roller, the drive surface 42 of the fixed member 38 should have an arcuate length of only approximately 120° rather than 180°.

While FIGS. 1 and 2*a*, *b* and *c* show a preferred embodiment of the invention wherein a toothed drive belt and toothed drive surface on the fixed member are utilized, the drive surface of the belt and the drive surface of the fixed member need not be toothed, and may have other types of driving surfaces. Referring to FIGS. 3*a*, *b* and *c*, three alternate drive surfaces of the drive surface 42 and of the belt 14 are shown. FIG. 3*a* shows a plan view of a portion of the drive surface 42 of the fixed member 38 as shown in FIGS. 1 and 2*a*, *b* and *c*, and a cross section of the toothed belt as shown in FIGS. 1 and 2*a*, *b* and *c*. A ploy-V belt may also be used. FIG. 3*b* shows a cross section of a poly-V belt along with a plan view of the drive surface 42 for use therewith. Further, a standard V-belt in an inside-out configuration may be used as shown in cross section in FIG. 3*c*. As shown in FIG. 3*c*, the drive surface 42 of the fixed member 38 is provided for a groove for receiving the belt.

If a drive belt, such as shown in FIGS. 3*b* or 3*c*, is utilized, the difference between the pitch line length of the belt and the pitch line length of the fixed member drive surface need not be an integral multiple of a predetermined distance, i.e., the tooth spacing of the belt, and an adjustable drive reduction may be provided in accordance with this invention. Referring to FIG. 5, a rotating member 82 similar to the member 50 of FIG. 1 is shown. Elements of rotating member 82 which correspond to elements of the rotating member 50 shown in FIG. 1, will be identified by the same numeral. In addition to the rollers 52 and 54, a second pair of secondary elements shown as rollers 84 and 86 are also provided. Rollers 84 and 86, which are of a smaller diameter than rollers 52 and 54, and rollers 52 and 54 are supported from a pair of cross-shape support arms 88, only one of which is shown. A pair of elongated apertures 90 and 92 are formed in a cross-shape member 88 for receiving pinions 94 and 96 supporting the rollers 84 and 86 respectively. The pinions are secured in position in the elongated apertures 90 and 92 by suitable means not shown. The geometry of the rotating member 82 is such that with the rollers 84 and 86 in their outermost position in the slots 90 and 92 as shown, the distance from the center of the shaft 44 to the outer surface of the rollers 84 and 86 is less than that from the center of the shaft 44 to the outermost surface of the rollers 52 and 54. Thus, as rotating member 82 is rotated, the rollers 84 and 86 do not cause the belt to be forced into engagement with the drive surface 42 of the fixed member 38. Rather, the function of the rollers 84 and 86 is to alter the length of the belt extending between the points of first contact and last contact of the belt with the drive surface 42, so as to alter the pitch line length of the belt and thereby the difference between it and the pitch line length of the fixed member drive surface, so as to vary the drive reduction of the belt drive mechanism. As the rollers 84 and 86 are moved toward the shaft 44 in the slots 90 and 92, the drive reduction is decreased, i.e., the belt is advanced a greater length for each revolution of the motor shaft 44.

It should be apparent to those skilled in the art, that while what has been described are considered at the present to be the preferred embodiments of this invention, in accordance with Patent Statutes, changes may be made in the disclosed drive mechanism without actually departing from the true spirit and scope of this invention.

What is claimed as new and desired to be secured by Letters Patent of the United States is:

1. In a belt drive mechanism for transmitting torque between a first revolving member and a second revolving member, a motion reduction mechanism comprising:

a. a fixed member having a semicylindrical drive surface concentric with the axis of rotation of said first revolving member, b. a rotating member secured to said first revolving member for rotation therewith, c. a drive belt passing between said rotating member and said drive surface of said fixed member, d. said rotating member having at least two elements, each of which elements will cause engagement of a portion of said belt with said drive surface of said fixed member so as to substantially prevent slippage therebetween, one of said elements of said rotating member causing engagement of a portion of said belt with said drive surface, said elements of said rotating member successively causing engagement of a portion of said belt with said drive surface, such that at least one portion of said belt is in engagement with said drive surface at all times, said drive surface of said fixed member defining a first pitch line distance of said belt on said drive surface between the position on said drive surface at which one of said elements of said rotating member first causes engagement of said belt with said drive surface, and the position of said drive surface at which the same one of said elements of said rotating member last causes engagement of said belt with said drive surface, and said rotating member defining a second pitch line distance of said belt between one of said elements and said adjacent element of said rotating member when said rotating member is in the position where one of said elements is engaging and said adjacent roller disengaging said belt from said drive surface, said belt being caused to advance by a distance corresponding to the difference between said first and second pitch line distances as said rotating member rotates through an arc sufficient to move one of said elements of said rotating member from the position at which it first causes engagement of said belt with said drive surface to the position at which it last causes engagement of said belt with said drive surface, whereby a decrease in the differences of said pitch line distances reduces the advance of said belt and thereby increases the force amplification of said belt applied to said second revolving member.

2. The motion reduction mechanism as set forth in claim 1 wherein said elements of said rotating member are rollers supported for rotation on axes parallel to and spaced from the axis of rotation of said first revolving member.

3. The motion reduction mechanism as set forth in claim 1 wherein said drive belt is provided with a toothed drive surface for engagement with teeth provided on said drive surface of said fixed member.

4. The motion reduction mechanism as set forth in claim 1 wherein said rotating member has two elements and said semicylindrical drive surface has an effective arcuate length of approximately 180°.

5. The motion reduction mechanism as set forth in claim 1 wherein said rotating member has three elements and said semicylindrical drive surface has an effective arcuate length of approximately 120°.

6. The motion reduction mechanism as set forth in claim 1 wherein said rotating member is provided with a secondary element, between each of said elements, which engages said belt, but which does not cause said belt to engage said drive surface, said secondary element being adjustably positioned so as to permit adjustment of said second pitch line distance and thereby change the force amplification of said belt applied to said second revolving member.

7. The motion reduction mechanism as set forth in claim 6 wherein said elements and said secondary elements of said rotating member are rollers supported for rotation on axes parallel to and spaced from the axis of rotation of said first revolving member.

* * * * *

UNITED STATES PATENT OFFICE
CERTIFICATE OF CORRECTION

Patent No. 3,765,268 Dated October 16, 1973

Inventor(s) Stephen L. McMillan

It is certified that error appears in the above-identified patent and that said Letters Patent are hereby corrected as shown below:

Claim 1, column 6, line 12, change "of" to --on--

Signed and sealed this 31st day of December 1974.

(SEAL)
Attest:

McCOY M. GIBSON JR.
Attesting Officer

C. MARSHALL DANN
Commissioner of Patents